United States Patent
Gonzui

(10) Patent No.: US 11,040,403 B2
(45) Date of Patent: Jun. 22, 2021

(54) CUTTING INSERT, CUTTING TOOL INCLUDING SAME, AND METHOD FOR MANUFACTURING MACHINED PRODUCT

(71) Applicant: KYOCERA Corporation, Kyoto (JP)

(72) Inventor: Hirotoshi Gonzui, Moriyama (JP)

(73) Assignee: Kyocera Corporation, Kyoto (JP)

( * ) Notice: Subject to any disclaimer, the term of this patent is extended or adjusted under 35 U.S.C. 154(b) by 0 days.

(21) Appl. No.: 16/616,672

(22) PCT Filed: May 21, 2018

(86) PCT No.: PCT/JP2018/019535
§ 371 (c)(1),
(2) Date: Nov. 25, 2019

(87) PCT Pub. No.: WO2018/221300
PCT Pub. Date: Dec. 6, 2018

(65) Prior Publication Data
US 2020/0198018 A1  Jun. 25, 2020

(30) Foreign Application Priority Data
May 29, 2017 (JP) .............................. JP2017-105879

(51) Int. Cl.
*B23B 27/14* (2006.01)
*B23B 27/16* (2006.01)
(Continued)

(52) U.S. Cl.
CPC ................ *B23B 27/16* (2013.01); *B23B 1/00* (2013.01); *B23B 27/145* (2013.01);
(Continued)

(58) Field of Classification Search
CPC .............. B23B 1/00; B23B 2200/0461; B23B 2228/12; B23B 27/14; B23B 2200/328; B23B 27/145; B23B 27/16; B23B 27/164
See application file for complete search history.

(56) References Cited

U.S. PATENT DOCUMENTS

| 10,195,673 B2 * | 2/2019 | Goldsmith | ................ B24B 3/34 |
| 10,195,676 B2 * | 2/2019 | Ootaka | .................... B23B 27/16 |

(Continued)

FOREIGN PATENT DOCUMENTS

| JP | 06-170614 A | 6/1994 |
| JP | 08-174327 A | 7/1996 |

(Continued)

*Primary Examiner* — Sara Addisu
(74) *Attorney, Agent, or Firm* — Volpe Koenig

(57) ABSTRACT

An insert based on an aspect includes a first face, a second face located opposite to the first face, a third face located between the first face and the second face, and a cutting edge located on an intersection of the first face and the third face. The first face includes a first region inclined so as be close to the second face as being separated away from the cutting edge. A virtual straight line orthogonal to the cutting edge is set as a first virtual straight line in a front view of the first face. A ten-point average of roughness the first region in a direction along the first virtual straight line is expressed by $Rz1a$ and a ten-point average of roughness of the first region in a direction along the cutting edge is expressed by $Rz1b$, and $Rz1a$ is larger than $Rz1b$.

20 Claims, 8 Drawing Sheets

(51) Int. Cl.
    *B23B 27/22*     (2006.01)
    *B32B 9/00*     (2006.01)
    *B23B 1/00*     (2006.01)

(52) U.S. Cl.
    CPC ..... *B23B 27/164* (2013.01); *B23B 2200/0461* (2013.01); *B23B 2228/12* (2013.01)

(56) References Cited

U.S. PATENT DOCUMENTS

| | | | |
|---|---|---|---|
| 2007/0154737 A1* | 7/2007 | Itoh | B23B 27/141 428/698 |
| 2008/0260477 A1* | 10/2008 | Omori | B23C 5/20 407/119 |

FOREIGN PATENT DOCUMENTS

| | | | | |
|---|---|---|---|---|
| JP | 2005-279821 A | 10/2005 | | |
| JP | 2005-313287 A | 11/2005 | | |
| JP | 2012-011471 A | 1/2012 | | |
| WO | 2016/031921 A1 | 3/2016 | | |
| WO | WO-2018155644 A1 * | 8/2018 | ............. | B23B 27/16 |

\* cited by examiner

CUTTING INSERT, CUTTING TOOL INCLUDING SAME, AND METHOD FOR MANUFACTURING MACHINED PRODUCT

CROSS-REFERENCE TO RELATED APPLICATIONS

This application is a national stage entry according to 35 U.S.C. 371 of PCT Application No. PCT/JP2018/019535 filed on May 21, 2018, which claims priority to Japanese Application No. 2017-105879 filed on May 29, 2017, which are entirely incorporated herein by reference.

TECHNICAL FIELD

The present aspect relates to a cutting insert that is used in machining.

BACKGROUND ART

A cutting tool is used when a workpiece is subjected to machining such as milling and turning. The cutting tool generally includes a holder including a pocket and a cutting insert mounted to the pocket. As the cutting insert, a cutting insert (chip) described in JP 2005-313287 A (Patent Document 1) is known.

The cutting insert described in Patent Document 1 includes a relief face, a rake face, and a cutting edge (an outer peripheral cutting edge and a bottom cutting edge) located on the boundary between those faces. Further, the rake face of the cutting insert described in Patent Document 1 includes a region, which is a portion along the outer peripheral cutting edge and has surface roughness Rz of 0.2 μm or less; and a region, which is a portion along the bottom cutting edge and has surface roughness Rz of from 1 μm to 5 μm.

When the surface roughness of the rake face is large, only a limited portion of a surface of the cutting insert contacts chips. Thus, there may be a risk in that wear on the rake face is liable to advance. Meanwhile, when the surface roughness of the rake face is small, a contact surface area between the rake face and chips is increased. Thus, the cutting insert has a high temperature due to frictional heat generated with chips, and hence there may be a risk in that durability of the cutting insert is degraded. Thus, a cutting insert with satisfactory wear resistance and durability is in demand.

SUMMARY OF INVENTION

An insert based on a non-limiting aspect includes a first face, a second face located opposite to the first face, a third face located between the first face and the second face, and a cutting edge located on an intersection of the first face and the third face. The first face includes a first region inclined so as be close to the second face as being separated away from the cutting edge. A virtual straight line orthogonal to the cutting edge is set as a first virtual straight line in a front view of the first face. A ten-point average of roughness the first region in a direction along the first virtual straight line is expressed by Rz1a and a ten-point average of roughness of the first region in a direction along the cutting edge is expressed by Rz1b, and the Rz1a is larger than the Rz1b.

DESCRIPTION OF EMBODIMENTS

A detailed description will be given below of a cutting insert 1 (hereinafter, simply referred to as "the insert 1") according to a non-limiting embodiment with reference to the drawings. However, for the ease of description, each of the drawings referred to below is simplified, and illustrates only the main constituent members needed to describe embodiments. Accordingly, the insert may be provided with an optional constituent member that is not illustrated in each of the referred drawings. In addition, dimensions of the members in each of the drawings do not faithfully represent actual dimensions of the constituent members, dimension ratios of each of the members, or the like.

Figure 1:
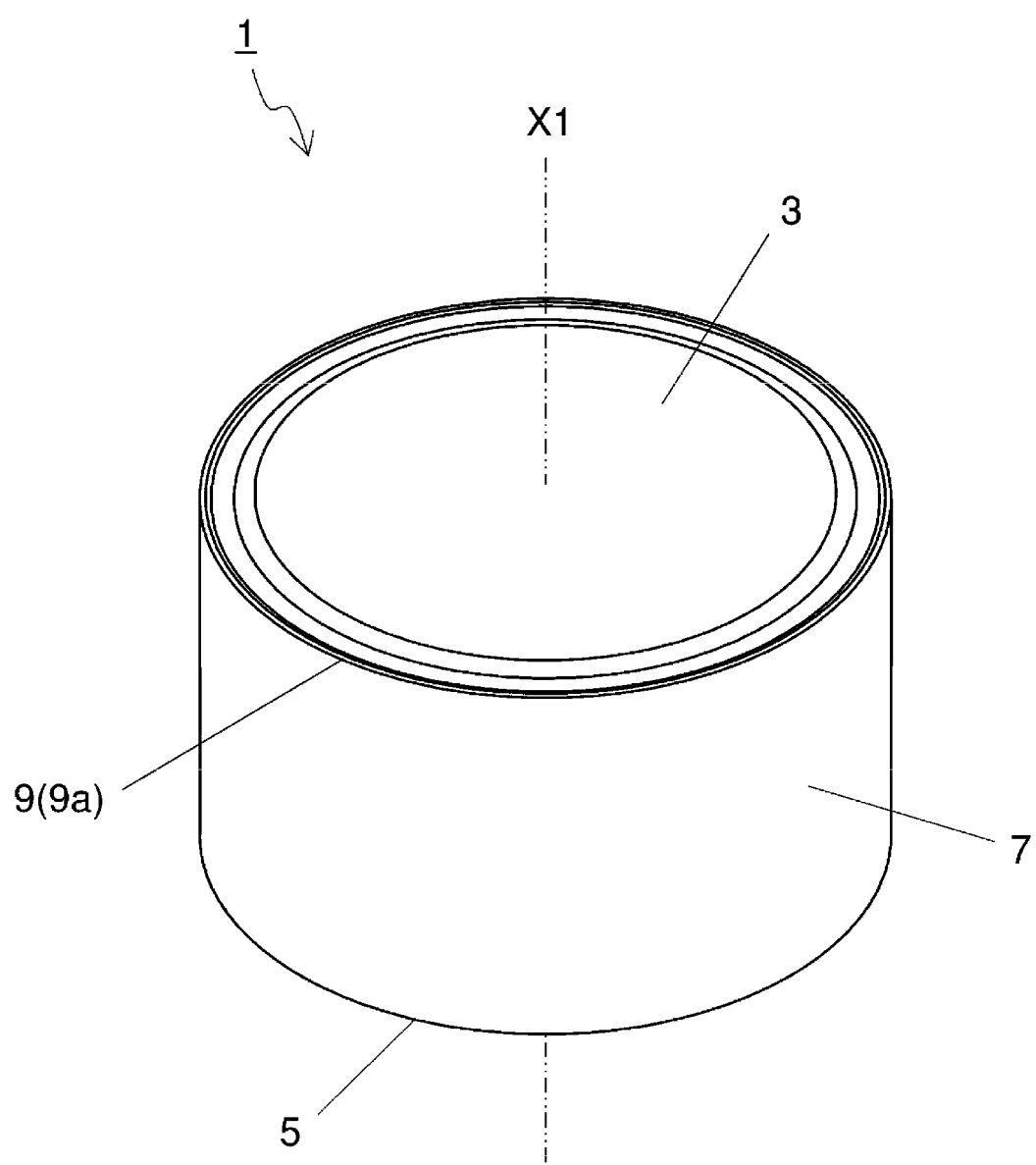
FIG. 1 is a perspective view illustrating a cutting insert according to a non-limiting embodiment.

The insert 1 may have a circular plate shape and may include a first face 3 that is circular (an upper face in FIG. 1), a second face 5 located on a side opposite to the first face 3 (a lower face in FIG. 1), and a third face 7 located between the first face 3 and the second face 5 (a side face in FIG. 1). Further, the insert 1 may include a cutting edge 9. The cutting edge 9 may include a first cutting edge 9a located on at least a part of a ridge line on which the first face 3 and the third face 7 intersect.

Figure 2:
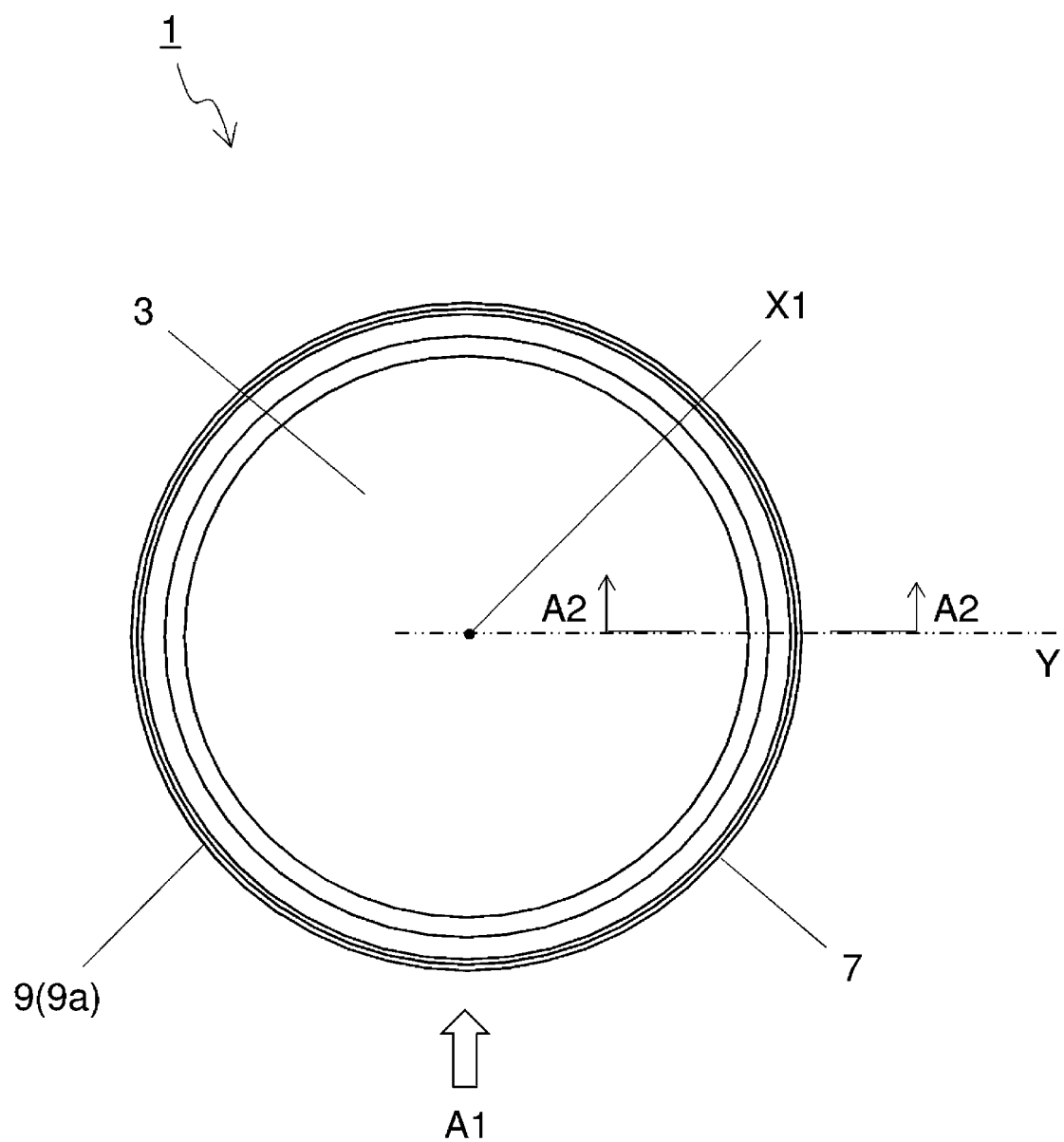
FIG. 2 is a plan view of a first face of the cutting insert illustrated in FIG. 1 as viewed from a front side.

The first face 3 of the insert 1 in one example illustrated in FIG. 2 may be circular. Further, the second face 5 may be also circular similar to the first face 3. However, the first face 3 and the second face 5 are not limited to such configurations. For example, the first face 3 and the second face 5 may have a polygonal shape such as a triangular shape, a quadrilateral shape, and a pentagonal shape.

The first face 3 and the second face 5 in one example illustrated in FIG. 1 may have the same size. Thus, the third face 7 may be orthogonal to the first face 3 and the second face 5. Note that, the first face 3 and the second face 5 are not limited to such configurations. For example, the second face 5 may be slightly smaller than the first face 3. In this case, the third face 7 may have such shape that, as approaching the boundary with the second face 5 from the boundary with the first face 3, the third face 7 may be inclined to be brought close to a center axis X1 passing through the center of the first face 3 and the center of the second face 5.

The size of the insert 1 is not particularly limited. For example, the maximum width of the first face 3 may be set to approximately from 3 mm to 20 mm. Further, the height from the first face 3 to the second face 5 may be set to approximately from 5 mm to 20 mm.

The first cutting edge 9a may be located on at least a part of the ridge line on which the first face 3 and the third face 7 intersect. In one example illustrated in FIG. 2, the first face 3 may be circular, and hence the first cutting edge 9a may be circular. Further, in one example illustrated in FIG. 2, the first cutting edge 9a may be located on the entire ridge line on which the first face 3 and the third face 7 intersect. However, since the first cutting edge 9a is only required to be located on at least a part of the ridge line on which the first face 3 and the third face 7 intersect, the first cutting edge 9a may be located only on a part of the ridge line on which the first face 3 and the third face 7 intersect.

Figure 3:
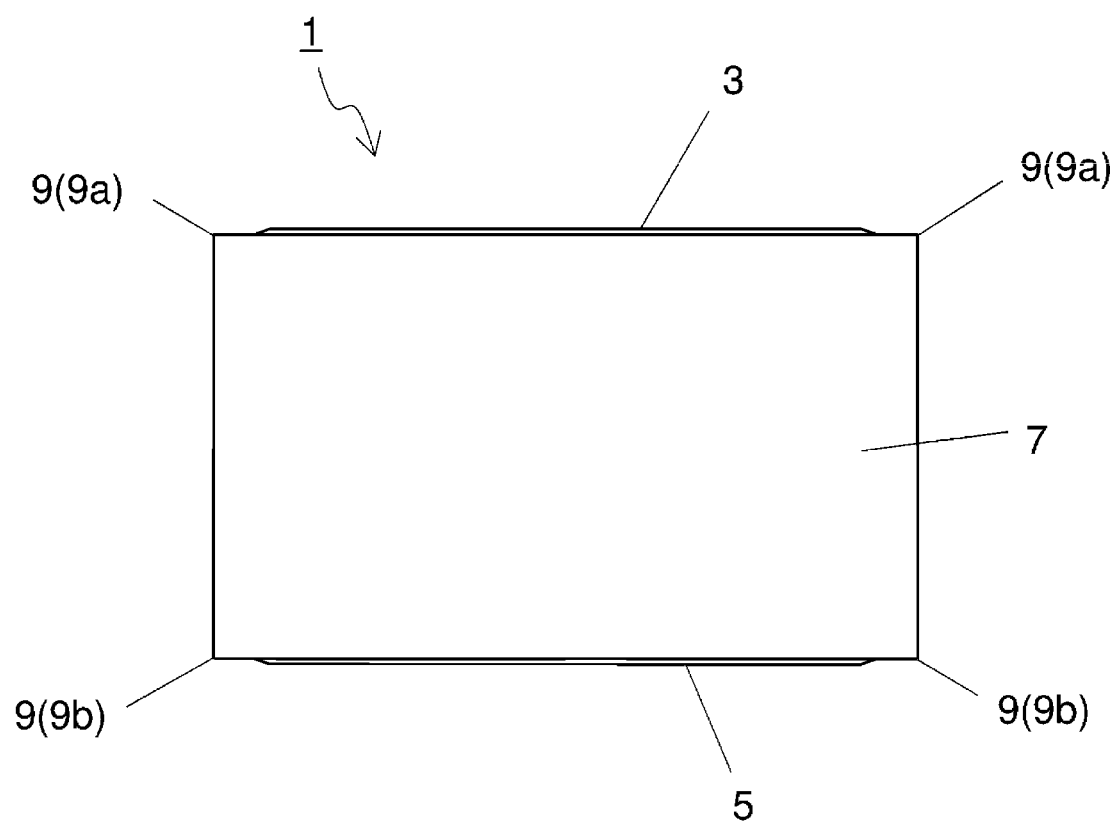
FIG. 3 is a side view of the cutting insert illustrated in FIG. 2 as viewed from a direction A1.

Further, in one example illustrated in FIG. 3, the cutting edge 9 may further include a second cutting edge 9b in addition to the first cutting edge 9a. The second cutting edge 9b may be located on at least a part of a ridge line on which the second face 5 and the third face 7 intersect. When the first face 3 is viewed in a plane perspective, the first cutting edge 9a and the second cutting edge 9b may overlap each other.

The first face 3 may include a first region 11 that is located along the first cutting edge 9a and is inclined so as to be close to the second face 5 as being separated away from the first cutting edge 9a. The first face 3 may be connected to the first cutting edge 9a. The first region 11 may be used as a rake face when the insert 1 is used for machining a workpiece.

As illustrated in FIG. 2, when the first face 3 is viewed from a front side, a first virtual straight line Y orthogonal to the first cutting edge 9a may be set. At this time, a ten-point average of roughness of the first region 11 in a direction along the first virtual straight line Y may be expressed by Rz1a, and a ten-point average of roughness of the first region 11 in a direction along the first cutting edge 9a may be expressed by Rz1b. In the insert 1 according to the embodiment, Rz1a may be larger than Rz1b.

Figure 4:
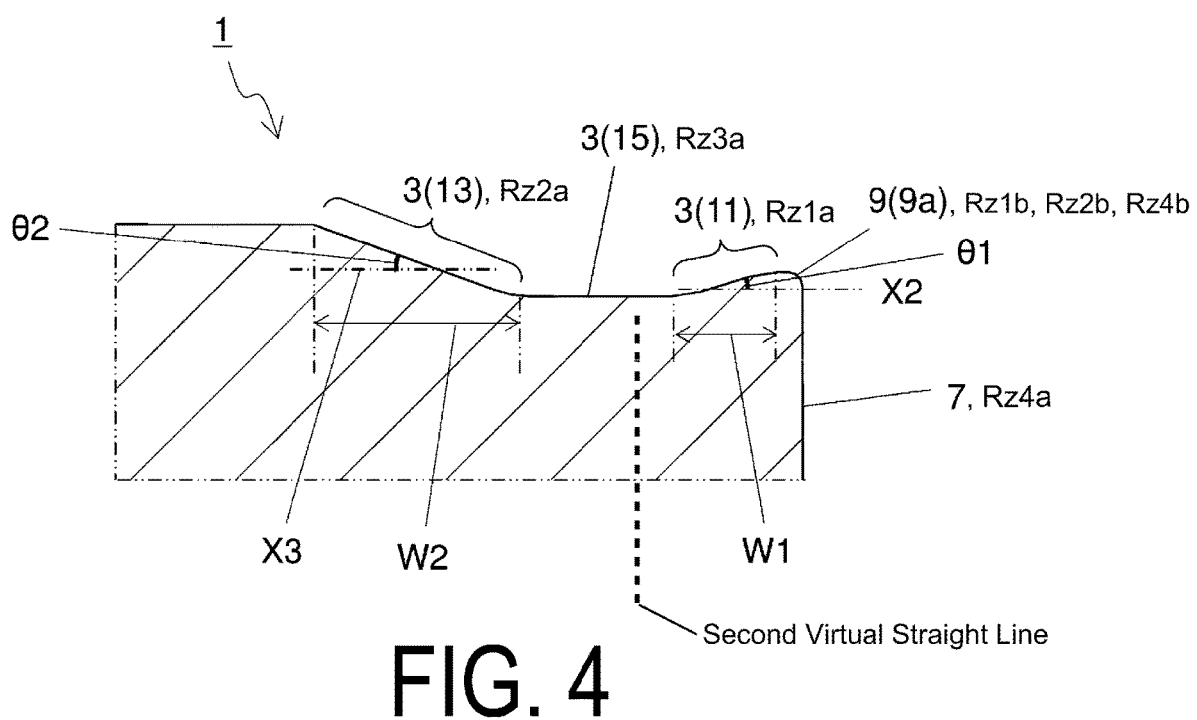
FIG. 4 is a cross-sectional view of the cutting insert illustrated in FIG. 2 taken along a cross-section A2-A2.

Note that, FIG. 4 may be a cross-section including the first virtual straight line Y, and the portion of the first face 3 illustrated in FIG. 4 may be a portion of the first face 3 along the first virtual straight line Y. Further, in FIG. 4, the direction along the first virtual straight line Y may correspond to a right-and-left direction.

In the embodiment, "the ten-point average of roughness in the direction along the first cutting edge 9a" may indicate a ten-point average of roughness on a virtual line having a constant interval with the first cutting edge 9a when the first face 3 is viewed from a front side. Thus, when the first cutting edge 9a is linear, the virtual line may be illustrated linearly. Further, when the first cutting edge 9a is in an arc shape, the virtual line may be illustrated in an arc shape.

As described above, with respect to the surface roughness indicated in a ten-point average of roughness, the surface roughness of the first region 11 may be not simply large, but Rz1b may be relatively small. Thus, an area of a portion that contacts chips in the direction along the first cutting edge 9a at the time of machining can be secured, and hence wear of the first region 11 of the insert 1 can be suppressed from advancing.

Further, the surface roughness of the first region 11 may be not simply small, but Rz1a may be relatively large. Thus, the contact surface area between the first region 11 and chips in the direction along the first virtual straight line Y at the time of machining can be suppressed from being increased excessively. In another viewpoint, chips passing on the first region 11 are more likely to contact the first region 11 intermittently. Thus, the insert 1 can be suppressed from having an excessively high temperature due to frictional heat generated with chips. Hence, durability of the insert 1 may be high. For the reasons described above, the insert 1 may have high wear resistance and durability.

Furthermore, in the insert 1 according to the embodiment, Rz1a may be larger than Rz1b, and hence the surface roughness of the first region 11 may be relatively large in a chip advancing direction. Thus, a brake may be more likely to be applied to chips advancing on the first region 11. With this, chips are more likely to be curled and suppressed from being elongated.

Rz1a and Rz1b are not limited to specific values. For example, Rz1a may be set to approximately from 2 μm to 10 μm. Further, Rz1b may be set to approximately from 0.2 μm to 8 μm.

When Rz1a is 2 μm or more, the contact surface area between the first region 11 and chips may be more likely to be suppressed from being excessively increased. Further, when Rz1a is 10 μm or less, the first region 11 of the insert 1 may be less liable to be damaged, and hence wear of the first region 11 of the insert 1 may be more likely to be suppressed from advancing. When Rz1b is 0.2 μm or more, the contact surface area between the first region 11 and chips may be more likely to be suppressed from being excessively increased. Further, when Rz1b is 8 μm or less, the area of the portion that contacts chips at the time of machining may be more likely to be secured.

In order to measure the ten-point average of roughness Rz1a and Rz1b of the first region 11 in the embodiment, the surface shape of the first region 11 may be measured in each of the direction along the first virtual straight line Y and the direction along the first cutting edge 9a in accordance with the JIS B0601-2001 standard in addition to fixing a cut-off value to 0.08 mm. In one example illustrated in FIG. 3, the first face 3 may be circular, and the first cutting edge 9a may be in an arc shape. Thus, when the surface shape of the first region 11 in the direction along the first cutting edge 9a is measured, the surface shape may be measured on a curve along the arc shape of the first cutting edge 9a.

The measurement may be performed by utilizing, for example, a contact type surface roughness measuring machine using a contact needle or a non-contact type surface roughness measuring machine using a laser. Based on the measurement results, the ten-point average of roughness Rz1a and Rz1b of the first region 11 may be calculated.

In addition to the first region 11 described above, the first face 3 may further include a second region 13 locate on an inner side with respect to the first region 11. The second region 13 in one example illustrated in FIG. 4 may be inclined so as to be separated away from the second face 5 as being separated away from the first region 11. The second region 13 may be used as a rising face when the insert 1 is used for machining a workpiece. When the second region 13 is used as a rising face, chips may be more likely to be curled stably.

In the insert 1 according to the embodiment, Rz1a may be larger than Rz1b, and hence an appropriate brake may be more likely to be applied to chips on the first region 11. Thus, chips may be suppressed from contacting the second region 13 at a high speed, and hence wear of the second region 13 of the insert 1 may be more likely to be suppressed from advancing.

A ten-point average of roughness of the second region 13 in the direction along the first virtual straight line Y may be expressed by Rz2a, and a ten-point average of roughness of the second region 13 in the direction along the first cutting edge 9a may be expressed by Rz2b. Rz2a may be larger than Rz2b. When Rz2a is larger than Rz2b, wear resistance and durability of the insert 1 may be further improved. This is because of the following reasons.

The surface roughness of the second region 13 may be not simply large. When Rz2b is relatively small, the area of the portion that contacts chips in the direction along the first cutting edge 9a at the time of machining can be secured, and wear of the second region 13 of the insert 1 may be more likely to be suppressed from advancing.

Further, the surface roughness of the second region 13 may be not simply small. When Rz2a is relatively large, a contact surface area between the second region 13 and chips in the direction along the first virtual straight line Y at the time of machining can be suppressed from being increased excessively. In another viewpoint, chips passing on the second region 13 may be more likely to contact the second region 13 intermittently. Thus, the insert 1 can be suppressed from having an excessively high temperature due to frictional heat generated by chips. Therefore, durability of the insert 1 may be high.

Furthermore, when Rz2a is larger than Rz2b, the surface roughness of the second region 13 in the chip advancing direction may be relatively large. Thus, a brake may be more likely to be applied to chips advancing on the second region 13. With this, chips may be more likely to be curled and suppressed from being elongated.

Rz2a and Rz2b are not limited to specific values. For example, Rz2a may be set to approximately from 1 μm to 8 μm. Further, Rz2b may be set to approximately from 0.1 μm to 6 μm.

When Rz2a is 1 μm or more, the contact surface area between the second region 13 and chips may be more likely to be suppressed from being excessively increased. Further, when Rz2a is 8 μm or less, the second region 13 of the insert 1 may be less liable to be damaged, and hence wear of the second region 13 of the insert 1 may be more likely to be suppressed from advancing. When Rz2b is 0.1 μm or more, the contact surface area between the second region 13 and chips may be more likely to be suppressed from being excessively increased. Further, when Rz2b may be 6 μm or less, the area of the portion that contacts chips at the time of machining may be more likely to be secured.

In order to measure the ten-point average of roughness Rz2a and Rz2b of the second region 13 in one example illustrated in FIG. 4, measurement may be performed in accordance with the JIS B0601-2001 standard in addition to fixing a cut-off value to 0.08 mm in a manner similar to the measurement of Rz1a and Rz1b.

In a case that the first face 3 includes the first region 11 and the second region 13, and Rz1a may be larger than Rz2a, durability of the insert 1 may be further improved. The first region 11 may be closer to the first cutting edge 9a than the second region 13, and hence the first region 11 may be more liable to have high frictional heat due to contact with chips than the second region 13. However, when Rz1a is larger than Rz2a, the contact surface area between the first region 11 and chips may be small. Thus, frictional heat can be suppressed from being generated on the first region 11.

Further, in a case that the first face 3 includes the first region 11 and the second region 13, and Rz2b is smaller than Rz1b, wear of the insert 1 can further be suppressed from advancing. Chips may be more liable to strongly hit the second region 13, which can be used as a rising face, than the first region 11, and hence wear of the insert 1 may be more liable to advance on the second region 13 than on the first region 11. However, when Rz2b is smaller than Rz1b, the contact surface area between the second region 13 and chips in the direction along the first cutting edge 9a may be more likely to be secured.

An inclination angle of the first region 11 may be expressed by $\theta 1$, and an inclination angle of the second region 13 may be expressed by $\theta 2$. The inclination angles $\theta 1$ and $\theta 2$ are not limited to specific values. For example, $\theta 1$ may be set to approximately from 0.1 degrees to 30 degrees. Further, $\theta 2$ may be set to approximately from 5 degrees to 70 degrees. When $\theta 2$ is larger than $\theta 1$, $\theta 1$ may be relatively small, and hence a thickness of a blade tip of the insert 1 may be more likely to be secured. Further, $\theta 2$ may be relatively large, and hence chips may be more likely to be curled stably on the second region 13.

Note that, in the cross-section illustrated in FIG. 4, $\theta 1$ may be indicated with an angle formed between the first region 11 and a virtual straight line X2. Further, $\theta 2$ may be indicated with an angle formed between the second region 13 and a virtual straight line X3. Here, although the center axis itself is not illustrated in FIG. 4, FIG. 4 may be a view illustrating the cross-section including the center axis. The virtual straight line X2 and the virtual straight line X3 may be orthogonal to the center axis. Further, in FIG. 4, the virtual straight line X2 and the virtual straight line X3 may be parallel to the second face 5.

Note that, in the cross-section as illustrated in FIG. 4, when the inclination angle of the first region 11 is not constant, the inclination angle of the first region 11 may have a maximum value of $\theta 1$. Further, when the inclination angle of the second region 13 is not constant, the inclination angle of the second region 13 may have a maximum value of $\theta 2$.

Furthermore, in a case that $\theta 2$ is larger than $\theta 1$, and the first face 3 is viewed from a front side, a width W2 of the second region 13 in the direction along the first virtual straight line Y may be larger than a width W1 of the first region 11 in the direction along the first virtual straight line Y. When the first region 11 and the second region 13 have the configurations described above, durability of the insert 1 can be further improved, and chips can be curled stably for the following reasons.

When the width W1 of the first region 11 is relatively small, a depth from the first cutting edge 9a to a lower end of the first region 11 may be small. Thus, strength of the first cutting edge 9a may be high. With this, chipping may be less liable to be caused to the blade tip, and hence durability of the insert 1 may be improved. Further, when the width W2 of the second region 13 is relatively large, chips can be stably brought into contact with the second region 13 even when a flow of the chips is unstable. Thus, chips can be curled stably on the second region 13.

In addition to the first region 11 and the second region 13 described above, the first face 3 may further include a third region 15 that is flat and located between the first region 11 and the second region 13. The third region 15 may be used as a connection face that connects the first region 11 and the second region 13 with each other. Further, depending on a mounting angle called an axial rake at the time of mounting the insert 1 to a holder, the third region 15 may be used as a rake face or a rising face.

Here, a ten-point average of roughness of the third region 15 in the direction along the first virtual straight line Y may be expressed by Rz3a. Rz3a may be smaller than Rz2a. When Rz3a is smaller than Rz2a, durability of the insert 1 may be further improved.

The first region 11 may be inclined so as to be close to the second face 5 as being separated away from the first cutting edge 9a. Further, the second region 13 may be inclined so as to be separated away from the second face 5 as being separated away from the first region 11. In this case, the third region 15 located between those regions may be located on a bottom of a recess formed by the first region 11, the second region 13, and the third region 15. Thus, chips may be liable to strongly hit the third region 15 than the first region 11 and the second region 13.

At this time, when Rz3a is smaller than Rz2a, a contact surface area between the third region 15 and chips may be more likely to be secured. With this, a crack may be less liable to be caused in the third region 15, and hence durability of the insert 1 can be improved even more. Note that, Rz3a is not limited to a specific value. Rz3a may be set to, for example, approximately from 0.1 µm to 10 µm.

The third face 7 located between the first face 3 and the second face 5 may be used as a relief face when the insert 1 is used for machining a workpiece. Here, when the third face 7 may be viewed from a front side, a second virtual straight line orthogonal to the first cutting edge 9a may be set. In this case, a ten-point average of roughness of the third face 7 in a direction along the second virtual straight line (an up-and-down direction in FIG. 4) may be expressed by Rz4a. When Rz4a is smaller than Rz1a, a finished surface of a workpiece may have high face accuracy.

Even when the third face 7 contacts a finished surface of a workpiece at the time of machining, the surface roughness Rz4a of the third face 7 may be relatively small, and hence a contact surface area of the third face 7 with the finished surface can be reduced. The contact surface area of the third face 7 with the finished surface may be reduced, and thus denaturation of a state of the finished surface due to frictional heat may be more likely to be suppressed.

Here, a ten-point average of roughness of the third face 7 in the direction along the first cutting edge 9a may be expressed by Rz4b. When Rz4b is smaller than Rz4a, a finished surface of a workpiece may have higher face accuracy. Rz4b may be relatively small. Thus, even when the surface shape of the third face 7 in the direction along the first cutting edge 9a is transferred onto the finished surface, smoothness of the finished surface may be less liable to be lost.

Examples of the material of the insert 1 may include inorganic materials such as cemented carbide alloy, cermet, and ceramics. Examples of the composition of the cemented carbide alloy may include WC (tungsten carbide)-Co, WC—TiC (titanium carbide)-Co, and WC—TiC—TaC (tantalum carbide)-Co. Here, WC, TiC, and TaC may be hard particles, and Co may be a binder phase.

In addition, the cermet may be a sintered composite material obtained by combining a metal with a ceramic component. Specifically, examples of the cermet may include compounds including TiC or TiN (titanium nitride) as a main component. Further, examples of compositions of the ceramics may include $Al_2O_3$ (aluminum oxide), $Al_2O_3$—TiC, $Al_2O_3$—TiN, SiC (silicon carbide), $Si_3N_4$ (silicon nitride), and SiAlON (sialon), and the like. Note that, the material of the insert 1 is not limited to those described above.

Further, although not particularly illustrated, the insert 1 may have a configuration including a base containing the material described above and a coating layer coating the base. Examples of the material of the coating layer may include a carbide, a nitride, an oxide, a carbon oxide, a nitrogen oxide, a carbon nitride, a carbon-nitrogen oxide, and the like of titanium. The coating layer may contain only one or a plurality of the materials described above. Further, the coating layer may be formed of only one layer or a plurality of laminated layers. Note that, the material of the coating layer is not limited to those.

The coating layer may be located on the base by a chemical vapor deposition (CVD) method or a physical vapor deposition (PVD) method. For example, when the coating layer is formed by the vapor deposition method described above under a state in which a part of the third face 7 supports the base, the coating layer may be located so as to coat the entire surface of the base except for the part of the third face 7 described above.

Next, description will be given of a cutting tool 101 according to an embodiment using drawings.

Figure 5:
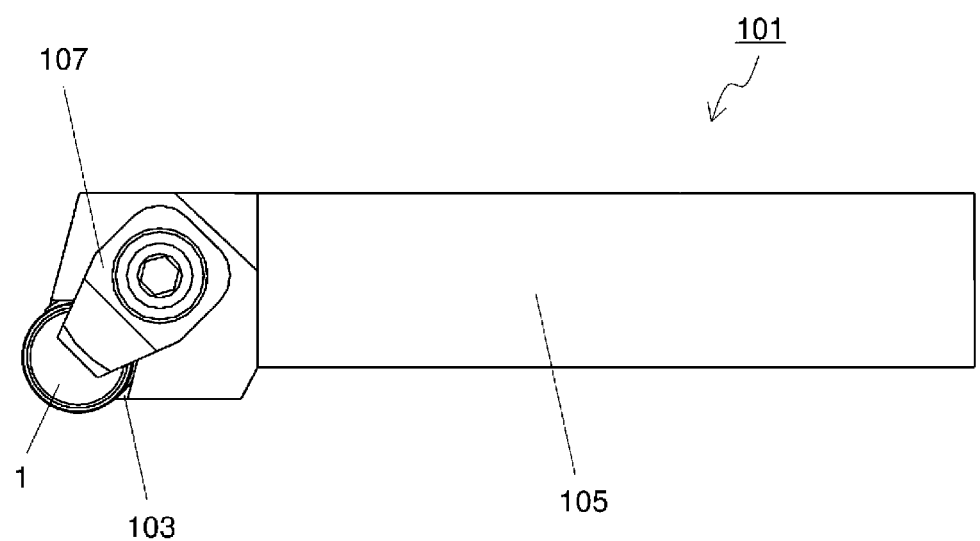
FIG. 5 is a plan view illustrating a cutting tool according to a non-limiting embodiment.

As illustrated in FIG. 5, the cutting tool 101 may be a rod-like body extending from a first end (a left end in FIG. 5) to a second end (a right end in FIG. 5) and may include a holder 105 including a pocket 103 on a side of the first end; and the above-mentioned insert 1 located in a pocket 103.

Specifically, the insert pocket 103 may be a portion to which the insert 1 is mounted and may include a seating face, which is parallel to a second face of the holder 105, and a binding side face, which is inclined with respect to the seating face. Further, the pocket 103 may be opened on the side of the first end of the holder 105.

The insert 1 may be located in the pocket 103. At this time, the second face of the insert 1 may directly contact the pocket 103, and additionally a sheet may be sandwiched between the insert 1 and the pocket 103.

The insert 1 may be mounted in such manner that at least a part of the portion, which is used as the first cutting edge 9a on the ridge line on which the first face and the third face intersect, protrudes outward from the holder 105. In the embodiment, the insert 1 may be mounted on the holder 105 using a clamp member 107.

Steel, cast iron, or the like may be used as a material of the holder 105. In particular, when steel is used among those materials, toughness of the holder 105 may be high.

One example in the embodiment illustrated in FIG. 5 may be a cutting tool used in so-called turning processing. As the turning processing, for example, boring, outer diameter processing, and groove-forming may be cited. Note that, a cutting tool is not limited to those used in the turning processing. For example, the insert 1 according to the above-described embodiment may be used as a cutting tool used in milling processing.

Method for Manufacturing Machined Product

Next, description will be given of a method for manufacturing a machined product according to an embodiment.

A machined product may be manufactured by machining a workpiece 201. The method for manufacturing a machined product may include the following steps. Specifically the steps of:

(1) rotating the workpiece 201;

(2) bringing the cutting tool 101, exemplified by the embodiment described above, into contact with the workpiece 201 that is rotating.

(3) separating the cutting tool 101 from the workpiece 201;

may be provided.

Figure 6:
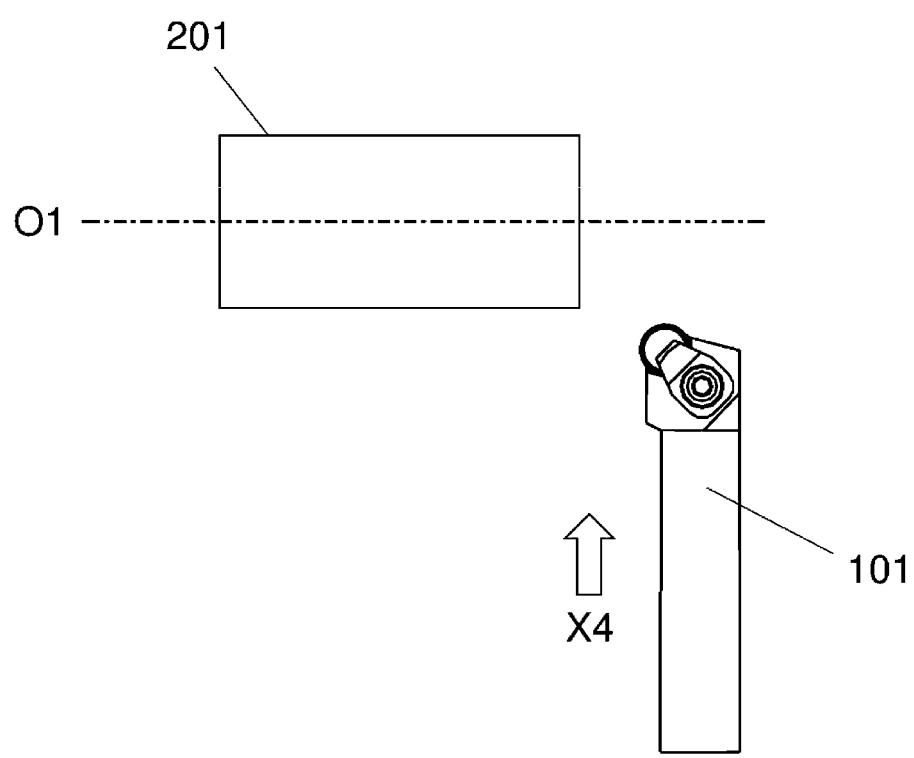
FIG. 6 is a schematic view illustrating one step of a method for manufacturing a machined product according to a non-limiting embodiment.
Figure 7:
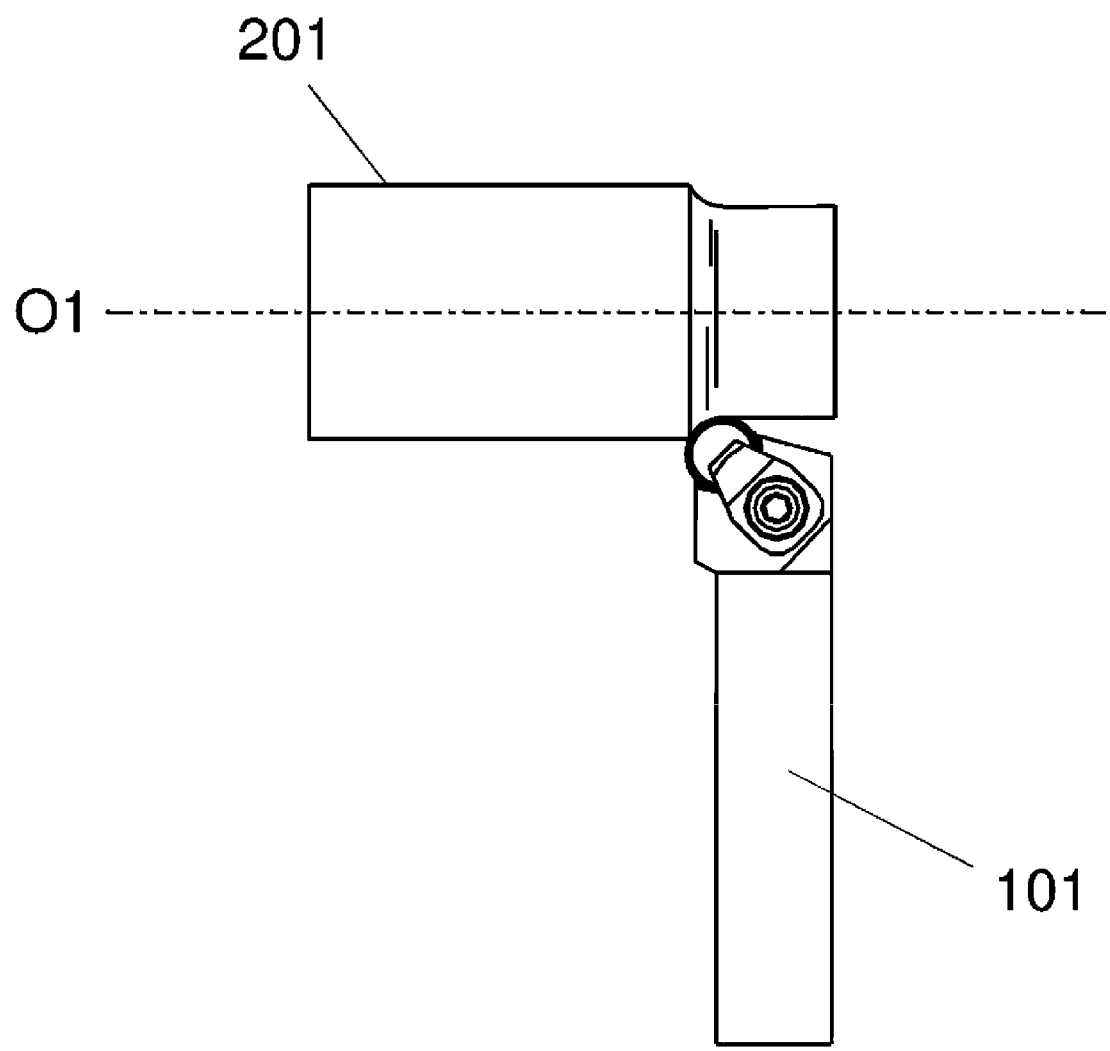
FIG. 7 is a schematic view illustrating one step of the method for manufacturing a machined product according to the embodiment.

More specifically, first, as illustrated in FIG. 6, the workpiece 201 may be caused to rotate about an axis O1, and the cutting tool 101 may be brought relatively close to the workpiece 201. Next, as illustrated in FIG. 7, the ridge line (cutting edge) of the cutting tool 101 may be brought into contact with the workpiece 201 and may cut the workpiece 201. Then, as illustrated in FIG. 8, the cutting tool 101 may be relatively moved away from the workpiece 201.

In FIG. 6, the cutting tool 101 may be brought close to the workpiece 201 by being moved in a direction X4 in a state where the axis O1 is fixed and the workpiece 201 is rotating about the axis O1. Furthermore, in FIG. 7, the workpiece 201 may be cut by bringing the cutting edge of the insert into contact with the workpiece 201 that is rotating. Furthermore, in FIG. 8, the cutting tool 101 may be moved away from the workpiece 201 by being moved in a direction X5 while the workpiece 201 is rotating.

Figure 8:
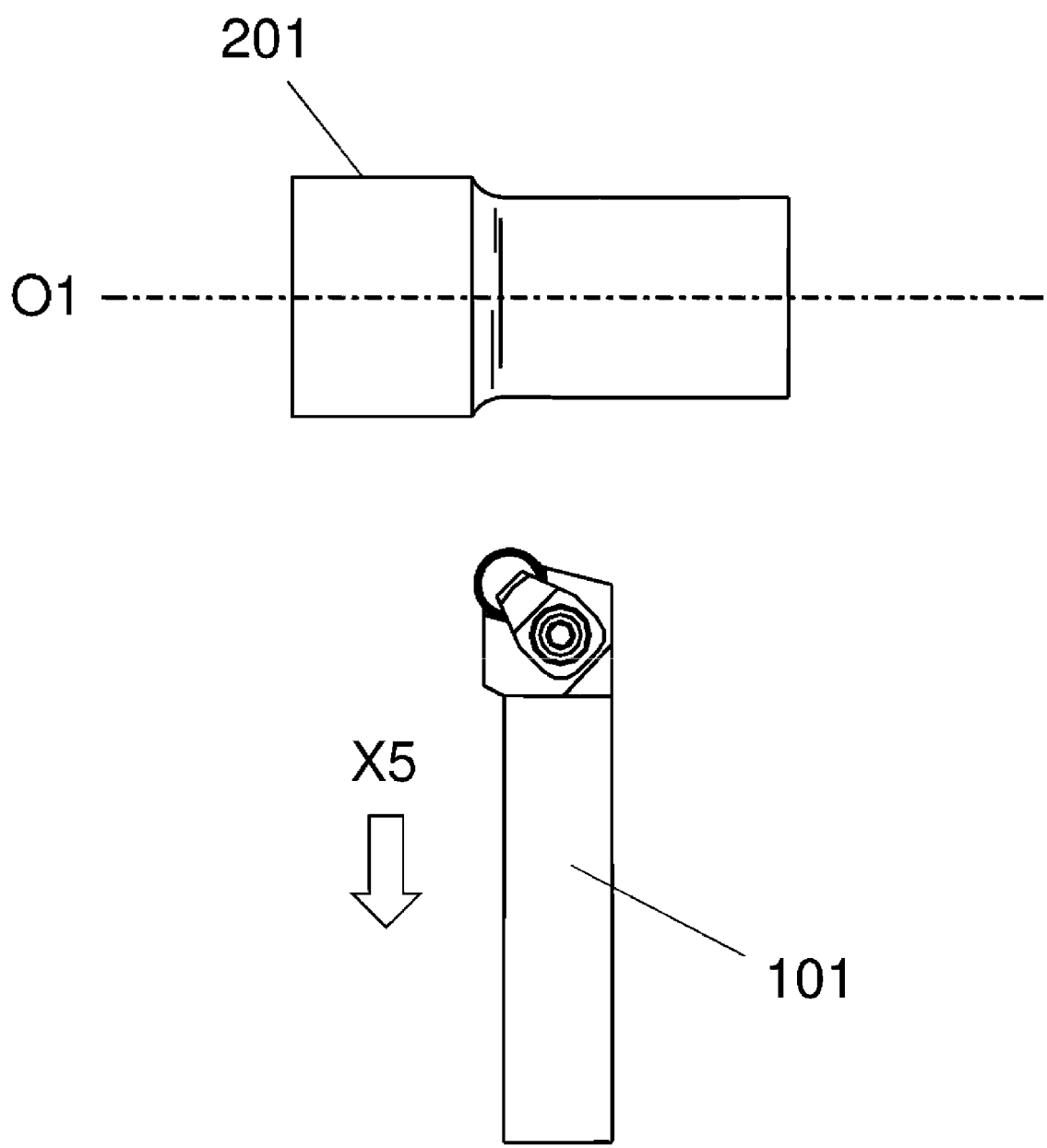
FIG. 8 is a schematic view illustrating one step of the method for manufacturing a machined product according to the embodiment.

Furthermore, in the machining of the manufacturing method according to the present embodiment illustrated in FIG. 6 to FIG. 8, in each of the steps, the cutting tool 101 may be brought into contact with the workpiece 201, or the cutting tool 101 may be separated from the workpiece 201 by moving the cutting tool 101. However, the present embodiment is of course not limited to such a mode.

For example, in step (1), the workpiece 201 may be brought close to the cutting tool 101. In the same manner, in step (3), the work piece 201 may be moved away from the cutting tool 101. In a case where the machining is to be continued, steps of bringing the cutting edge of the insert into contact with different places on the workpiece 201 may be repeated while maintaining the rotating state of the workpiece 201.

Here, representative examples of the material of the workpiece 201 may include carbon steel, alloy steel, stainless steel, cast iron, non-ferrous metals, or the like.

REFERENCE SIGNS LIST

1 Insert
3 First face
5 Second face
7 Third face
9 Cutting edge
9a First cutting edge
9b Second cutting edge
11 First region
13 Second region
15 Third region
101 Cutting tool
103 Pocket
105 Holder
107 Clamp member
201 Workpiece

The invention claimed is:

1. An insert, comprising:
a first face;
a second face located opposite to the first face;
a third face located between the first face and the second face; and
a cutting edge located on an intersection of the first face and the third face,
wherein the first face comprises:
  a first region inclined so as be close to the second face as being separated away from the cutting edge; and
  a second region that is located on an inner side with respect to the first region and inclined so as to be separated away from the second face as being separated away from the first region,
a virtual straight line orthogonal to the cutting edge is set as a first virtual straight line in a front view of the first face,
a ten-point average of roughness of the first region in a direction along the first virtual straight line is expressed by $Rz1a$ and a ten-point average of roughness of the first region in a direction along the cutting edge is expressed by $Rz1b$,
the $Rz1a$ is larger than the $Rz1b$,
a ten-point average of roughness of the second region in the direction along the first virtual straight line is expressed by $Rz2a$ and a ten-point average of roughness of the second region in the direction along the cutting edge is expressed by $Rz2b$, and
the $Rz2a$ is larger than the $Rz2b$, and
the $Rz1a$ is larger than the $Rz2a$.

2. The cutting insert according to claim 1, wherein the $Rz2b$ is smaller than the $Rz1b$.

3. The cutting insert according to claim 1, wherein
an inclination angle of the first region is expressed by $\theta1$ and an inclination angle of the second region is expressed by $\theta2$, and
the $\theta2$ is larger than the $\theta1$.

4. The cutting insert according to claim 3, wherein the first region has a first width in the direction along the first virtual straight line and the second region has a second width in the direction along the first virtual straight line, and
the second width is larger than the first width.

5. The cutting insert according to claim 1, wherein the first face further comprises a third region that is flat and located between the first region and the second region,
a ten-point average of roughness of the third region in the direction along the first virtual straight line is expressed by $Rz3a$, and
the $Rz3a$ is smaller than the $Rz2a$.

6. The cutting insert according to claim 1, wherein a virtual straight line orthogonal to the cutting edge is set as a second virtual straight line in a front view of the third face,
a ten-point average of roughness of the third face in a direction along the second virtual straight line is expressed by $Rz4a$, and
the $Rz4a$ is smaller than the $Rz1a$.

7. The cutting insert according to claim 6, wherein a ten-point average of roughness of the third face in the direction along the cutting edge is expressed by $Rz4b$, and
the $Rz4b$ is smaller than the $Rz4a$.

8. A cutting tool, comprising:
a holder including a pocket on a side of a first end of the holder; and
the cutting insert according to claim 1, located in the pocket.

9. A method for manufacturing a machined product, comprising:
rotating the cutting tool according to claim 8;
bringing the cutting tool that is rotating into contact with a workpiece; and
separating the cutting tool from the workpiece.

10. An insert, comprising:
a first face;
a second face located opposite to the first face;
a third face located between the first face and the second face; and
a cutting edge located on an intersection of the first face and the third face, wherein
the first face comprises:
  a first region inclined so as be close to the second face as being separated away from the cutting edge; and
  a second region that is located on an inner side with respect to the first region and inclined so as to be separated away from the second face as being separated away from the first region,
a virtual straight line orthogonal to the cutting edge is set as a first virtual straight line in a front view of the first face,
a ten-point average of roughness of the first region in a direction along the first virtual straight line is expressed by $Rz1a$ and a ten-point average of roughness of the first region in a direction along the cutting edge is expressed by $Rz1b$, the $Rz1a$ is larger than the $Rz1b$, a ten-point average of roughness of the second region in the direction along the first virtual straight line is expressed by $Rz2a$ and a ten-point average of roughness of the second region in the direction along the cutting edge is expressed by $Rz2b$, and the $Rz2a$ is larger than the $Rz2b$, and the $Rz2b$ is smaller than the $Rz1b$.

11. The cutting insert according to claim 10, wherein an inclination angle of the first region is expressed by $\theta 1$ and an inclination angle of the second region is expressed by $\theta 2$, and the 2 is larger than the $\theta 1$.

12. The cutting insert according to claim 11, wherein the first region has a first width in the direction along the first virtual straight line and the second region has a second width in the direction along the first virtual straight line, and the second width is larger than the first width.

13. The cutting insert according to claim 10, wherein the first face further comprises a third region that is flat and located between the first region and the second region, a ten-point average of roughness of the third region in the direction along the first virtual straight line is expressed by $Rz3a$, and the $Rz3a$ is smaller than the $Rz2a$.

14. A cutting tool, comprising:

a holder including a pocket on a side of a first end of the holder; and the cutting insert according to claim 10, located in the pocket.

15. An insert, comprising:

a first face;

a second face located opposite to the first face;

a third face located between the first face and the second face; and a cutting edge located on an intersection of the first face and the third face, wherein the first face comprises a first region inclined so as be close to the second face as being separated away from the cutting edge, a virtual straight line orthogonal to the cutting edge is set as a first virtual straight line in a front view of the first face, a ten-point average of roughness of the first region in a direction along the first virtual straight line is expressed by $Rz1a$ and a ten-point average of roughness of the first region in a direction along the cutting edge is expressed by $Rz1b$, the $Rz1a$ is larger than the $Rz1b$, a virtual straight line orthogonal to the cutting edge is set as a second virtual straight line in a front view of the third face, a ten-point average of roughness of the third face in a direction along the second virtual straight line is expressed by $Rz4a$, and the $Rz4a$ is smaller than the $Rz1a$.

16. The cutting insert according to claim 15, wherein an inclination angle of the first region is expressed by $\theta 1$ and an inclination angle of the second region is expressed by $\theta 2$, and the $\theta 2$ is larger than the $\theta 1$.

17. The cutting insert according to claim 16, wherein the first region has a first width in the direction along the first virtual straight line and the second region has a second width in the direction along the first virtual straight line, and the second width is larger than the first width.

18. The cutting insert according to claim 15, wherein the first face further comprises a third region that is flat and located between the first region and the second region, a ten-point average of roughness of the third region in the direction along the first virtual straight line is expressed by $Rz3a$, and the $Rz3a$ is smaller than the $Rz2a$.

19. The cutting insert according to claim 15, wherein a ten-point average of roughness of the third face in the direction along the cutting edge is expressed by $Rz4b$, and the $Rz4b$ is smaller than the $Rz4a$.

20. A cutting tool, comprising:

a holder including a pocket on a side of a first end of the holder; and the cutting insert according to claim 15, located in the pocket.

* * * * *